US005530759A

United States Patent [19]
Braudaway et al.

[11] Patent Number: 5,530,759
[45] Date of Patent: Jun. 25, 1996

[54] COLOR CORRECT DIGITAL WATERMARKING OF IMAGES

[75] Inventors: Gordon W. Braudaway, Yorktown Heights; Karen A. Magerlein, Ossining; Frederick C. Mintzer, Shrub Oak, all of N.Y.

[73] Assignee: International Business Machines Corporation, Armonk, N.Y.

[21] Appl. No.: 381,807

[22] Filed: Feb. 1, 1995

[51] Int. Cl.⁶ .................................................. H04K 1/00
[52] U.S. Cl. ................................ 380/54; 580/3; 580/4; 382/137; 355/201
[58] Field of Search ........................... 380/3, 4, 54, 59; 382/7; 355/201

[56] References Cited

U.S. PATENT DOCUMENTS

| | | | |
|---|---|---|---|
| 4,776,013 | 10/1988 | Kafri et al. | |
| 5,216,724 | 6/1993 | Suzuki et al. | 382/7 |
| 5,321,470 | 6/1994 | Hasuo et al. | 355/201 |
| 5,363,212 | 11/1994 | Taniuchi et al. | 358/452 |
| 5,426,710 | 6/1995 | Suzuki et al. | 382/135 |
| 5,434,649 | 7/1995 | Hasuo et al. | 355/201 |

OTHER PUBLICATIONS

J. Pickerell & A. Child, "Marketing Photography in the Digital Environment", 1994, Image Watermarking for Photoshop.

K. B. Benson, ed., "Television Engineering Handbook", McGraw–Hill Book Company, New York 1986.

*Primary Examiner*—David C. Cain
*Attorney, Agent, or Firm*—Richard M. Ludwin

[57] ABSTRACT

A system for placing a visible "watermark" on a digital image is disclosed, wherein an image of the watermark is combined with the digital image. The pixels of the watermark image are examined, and for each pixel whose value is not a specified "transparent" value, the corresponding pixel of the original image is modified by changing its brightness but its chromaticities. This results in a visible mark which allows the contents of the image to be viewed clearly, but which discourages unauthorized use of the image.

12 Claims, 5 Drawing Sheets

COLOR CORRECT DIGITAL WATERMARKING OF IMAGES

BACKGROUND OF THE INVENTION

1. Field of the Invention

This invention relates to the field of digital imaging and more particularly to the field of watermarking digital images.

2. Related Art

Digital imagery provides a means for many and/or widely scattered users to have access to a single object, such as a manuscript in a library, an object in a museum, a magazine article, or anything else which can be photographed or scanned. A digital image is a two-dimensional array of picture elements (pixels), each of which describes the color of the object at one point. Digital images may be conveniently stored in a digital computer, transmitted over communications lines, and reproduced at a remote location.

One of the significant deterrents to making large libraries of digital images publicly available is the concern, by the owners of the image content, about misappropriation of their images. In many cases, the owner of the medium from which the image was digitized earns revenue from some uses of the images. In this case the owner typically will wish to prevent the images from being copied and then used, royalty-free. An example of this might be a publisher who makes images available within the context of a digital book or magazine, but who also wishes to prevent the unauthorized copying and use of these images by other publishers. Another example of this might be that of an owner of an art collection who wishes to sell images of art objects in the collection for multimedia presentations, but does not want these images used for publishing books of art.

In other cases, the owner of the media may wish to prevent certain uses for other reasons. A national library, for instance, might be willing to make reproductions of various works available for study, yet unwilling to make them available in any form that might be used to advertise a product, such as pornography, that would be embarrassing to that institution.

Hence, the general problem is to devise techniques that produce images that are totally acceptable for some uses, and yet unacceptable for other uses. Frequently, it is desired to produce images that are entirely acceptable for inspection or study, yet unacceptable for publication. One method of accomplishing this is known as "watermarking".

A simple watermarking method is demonstrated in Jim Pickerell and Andrew Child, *Marketing Photography in the Digital Environment*, 1994. "Image Watermarking for Photoshop", an additional sheet available from the same company, gives instructions for applying a watermark using Photoshop. Pickerell and Child use the technique for protecting electronic catalogs of photographs and "clip art".

While watermarking is an effective way for copyright and media owners to control the use of their images, conventional watermarking processes can alter the chromaticities of the original image at points where the watermark appears. This effect may be undesirable from the perspective of both the viewer and the owner of the original image.

SUMMARY OF THE INVENTION

In light of the above, it is an object of the present invention to provide a digital watermark that preserves the chromaticities of the original image.

Thus, in accordance with an aspect of the present invention, a digital watermark is applied to an original image as a multiplicative correction to pixel sample values of the original image in a linear color space such that the chromaticities of the pixels are not changed.

In a preferred embodiment, a system for placing a visible watermark on a digital image examines the pixels of the watermark. For each pixel whose value is not a specified "transparent" value, the system modifies the corresponding pixel of the original image by changing the brightness but not the color. Advantageously, by ensuring that the color or an image is not changed, the contents of the watermarked image may be viewed clearly, while discouraging unauthorized use of the image.

Figure 1:
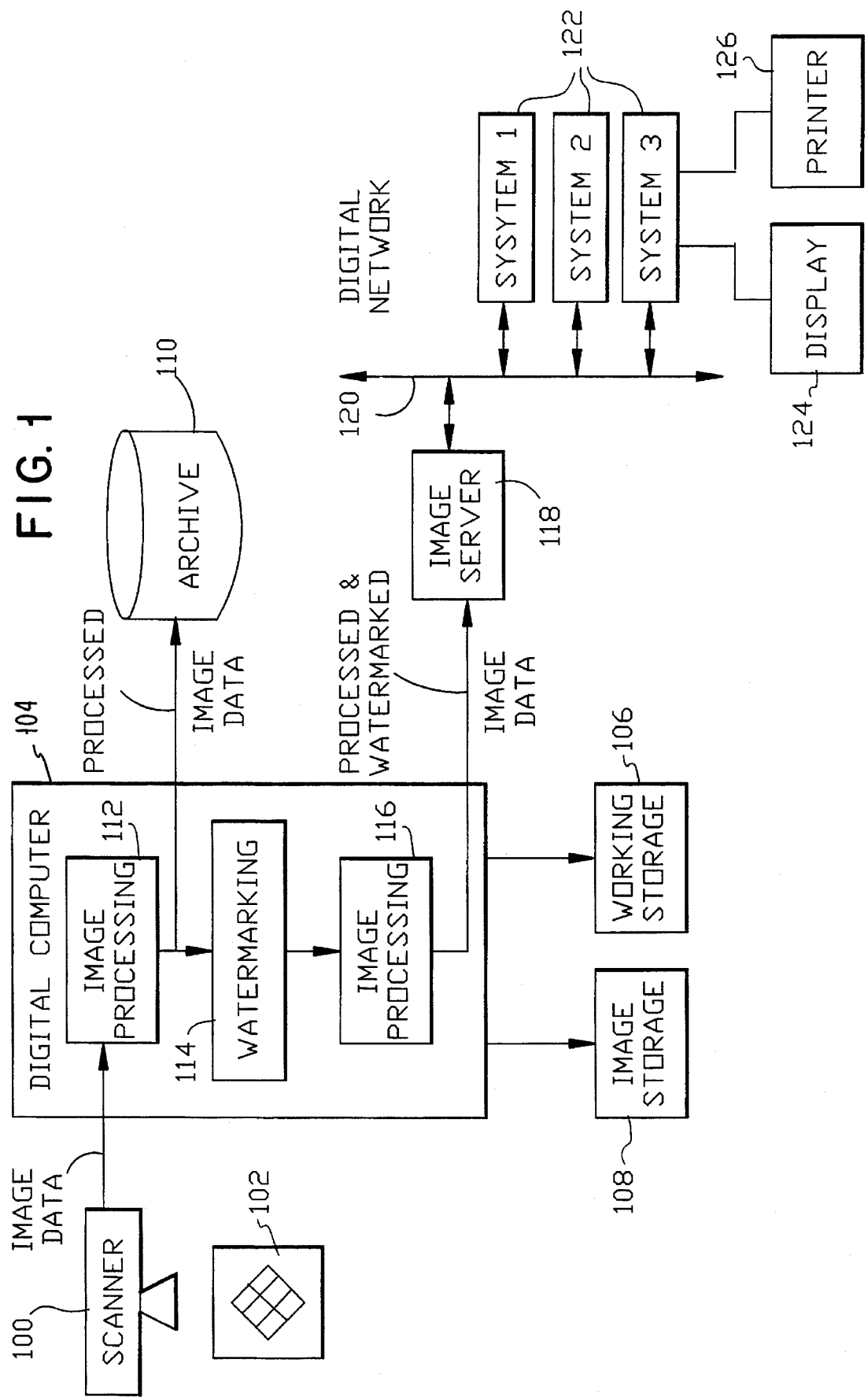
FIG. 1 is a block diagram of an image capture and distribution system suitable for use in accordance with an embodiment of the present invention.

DETAILED DESCRIPTION OF A PREFERRED EMBODIMENT a. Color Theory

Before proceeding with a description of the details of the invention, it is useful to present some background in color theory, and to describe the formats in which images to be watermarked are typically stored. Color theory is discussed in more detail in K. Blair Benson, ed., *Television Engineering Handbook*, McGraw-Hill Book Company, New York, 1986.

The sensation of color is evoked by the physical stimulation of light-sensitive elements in the human retina. The stimulation consists of electromagnetic radiation in the "visible" spectrum comprising wavelengths between approximately 380 and 780 nm. The light-sensitive elements, known as "cones", can be separated into three classes, each class being sensitive to a different spectral distribution of radiation. This "trichromacy" of color sensation means that many different spectral distributions can produce the same perceived color.

Because of the phenomenon of trichromacy, any color stimulus can be matched by a mixture of three primary stimuli, so long as none of the three primary stimuli can be matched by a mixture of the other two. All colors having the same tristimulus values will appear to be the same color. A commonly used set of primaries is the combination of red, green and blue, denoted as R, G and B. R, G and B have corresponding tristimulus values R, G and B which represent the component values for a given pixel.

Experimental results have shown that for most practical purposes color matches obey the rules of linearity and additivity. This principle, as applied to color, is known as Grassmann's law. What this means, as a practical matter, is that if two color stimuli are mixed, and the units of the stimuli are linear, the resulting stimulus will have tristimulus values which are equal to the sum of the tristimulus values of the two original colors.

The consequence of Grassmann's law is that if the tristimulus values of every monochromatic stimulus of unit radiance are known, the tristimulus values of any other stimulus can be calculated by integration. The tristimulus values of all monochromatic stimuli are denoted as $r(\lambda)$, $g(\lambda)$ and $b(\lambda)$ per unit radiance. Experimental measurements of color matching have been carried out using a significantly large sample of people known to have normal color vision. A set of three functions, $r(\lambda)$, $g(\lambda)$ and $b(\lambda)$, derived from these experiments have been used by the Commission International de I'Eclairage (CIE) in 1931 as the basis of an international standard.

At the same time the $r(\lambda)$, $g(\lambda)$ and $b(\lambda)$ color-matching functions were adopted as a standard, the CIE adopted another set of primary stimuli that have special properties; they are designated as X, Y and Z, with corresponding tristimulus values X, Y, and Z and color-matching functions $x(\lambda)$, $y(\lambda)$ and $z(\lambda)$. X, Y and Z are linearly related to R, G and B, i.e., there exists a matrix of constants, M, such that:

$$\begin{bmatrix} X \\ Y \\ Z \end{bmatrix} = M \begin{bmatrix} R \\ G \\ B \end{bmatrix} \qquad \text{EQUATION 1}$$

However, X, Y and Z are imaginary (non-physical) primaries chosen so all luminance information in any mixture of the three is contributed by Y. Another property of this choice is that the three color-matching functions have non-negative values at all wavelengths. These are known as the CIE 1931 XYZ color space and formulas. The color of a pixel may also be described in terms of its brightness, Y, and its chromaticities, x and y, where its chromaticities are derived from its X, Y and Z values as: $x=X/(X+Y+Z)$ and $y=Y/(X+Y+Z)$.

The CIE 1931 tristimulus values X, Y, and Z do not represent color information on a uniform-perceptibility basis. That is, a just-noticeable change in color is not represented by an equal change in its tristimulus values throughout the entire color space. In an attempt to remedy this perceptual non-uniformity, the CIE, in 1976, recommended a more perceptually uniform color space and formulas. These are known as CIE 1976 L*a*b* color space and formulas. The luminance component, L*, of this color space (also referred to as the perceptually uniform brightness) is defined as:

$$L^* = 116\, f(Y/Y_n) - 16 \qquad \text{EQUATION 2}$$

where $f(q) = q^{1/3}$ for $q > 0.008856$ $f(q) = 7.787q + 16/116$ for $q \leq 0.008856$ and where the value of $Y_n$ is the value of Y for a selected white reference, conventionally determined from the characteristics of the display or printing device on which the final, watermarked image will be produced.

There are two common types of images which are widely available in electronic form: monochrome and color. A monochrome (or grayscale) image typically represents each pixel as a single sample value describing the intensity of the pixel. A color image typically uses three sample values to represent the intensity and color of each pixel; these three samples may represent red/green/blue, y/cb/cr, intensity/saturation/hue, or the components of some other color space. Color images used in printing may have four components (cyan/magenta/yellow/black). Many other types of images (satellite data, MRI data, etc.) also exist. Those skilled in the art will recognize that there are many other ways to represent pixel information.

b. Detailed Description

FIG. 1 illustrates an image capture and distribution system suitable for use in accordance with an embodiment of the present invention. A scanner 100 captures image data from a physical source (such as a painting or photograph) 102 and sends it to a digital computer 104. The computer 104 includes a working storage 106 (typically embodied in the computer's random access memory), an image storage system 108 (which can be, for example, a conventional hard disk drive) and an image archive 110 (which can be, for example, a tape or disk storage). The computer 104 also includes a number of software modules. These include front end image processing software 112 which performs image processing (such as scaling and enhancement) on the image data provided by the scanner 100, color preserving watermarking software 114 (which operates in accordance with the principles of the present invention) and back-end image processing software 116 which performs functions such as compression (e.g., in accordance with the JPEG standard) on the watermarked image.

Preferably, the unprocessed or front-end processed original image is sent to the image archive 110 for preservation in unwatermarked form.

The watermarking software 114 applies a watermark to the front-end processed image in accordance with the principles of the present invention, will be described in more detail later. The watermarking process can be performed on a copy of the archived image or on other scanned and processed image data, which has been loaded in whole or in part, into the computer's working storage 106.

The processed, watermarked and compressed image produced by the combination of the software modules 112–116 is sent from the working storage 106 or image storage 108 (if a copy has been saved) to an image server 118 which is, in turn, connected to a digital network 120, which can be a Local Area Network (LAN), a Wide Area Network (WAN) such as the Internet, or both. Other systems 122 connected to the digital network 120 can request the images stored on the image server 118 via the digital network 120. The systems can then display the images on a display device (such as an SVGA monitor) 124 or print the images on a graphics capable printer 126. Those of skill in the art will recognize that there are may other system configurations in which the present invention could be employed.

In a preferred embodiment of the invention, the watermark image is a monochrome image consisting of 8-bit pixels which are treated (for convenience) as representing a linear intensity space. The watermark image can be, for example, a scanned image which was previously stored as a file in the image storage system 108 or a graphic (which can be created by a graphics program and also stored in the image storage system 108).

Each sample describing a component of an image pixel is stored using some fixed number of bits. For example, eight bits (one byte) can be used to specify one of 256 brightness levels (ranging from black to white) for a pixel in a monochrome image, or three eight-bit samples may describe one of 256 levels of red, one of 256 levels of green, and one of 256 levels of blue for a color image. Alternatively, each pixel can be described using an index to a "palette" or color table which in turn describes the component sample values; an eight-bit index allows an image to contain at most 256 separate colors. Those skilled in the art will recognize that pixel component values can be represented by any binary number of finite length.

In accordance with the present embodiment, watermark pixels with value 128 (hexadecimal 80) are "transparent", i.e., they indicate that the corresponding "original image" pixel is not to be altered. Watermark pixels with values from 0 to 127 indicate that the corresponding "original image" pixel is to be darkened; the amount of darkening is multiplied by (128−W)/128, where W is the value of the watermark pixel. Pixels with values from 129 to 255 indicate that the corresponding pixel is to be brightened; the amount of brightening is multiplied by (W−128)/128, where W is the value of the watermark pixel.

Figure 2:
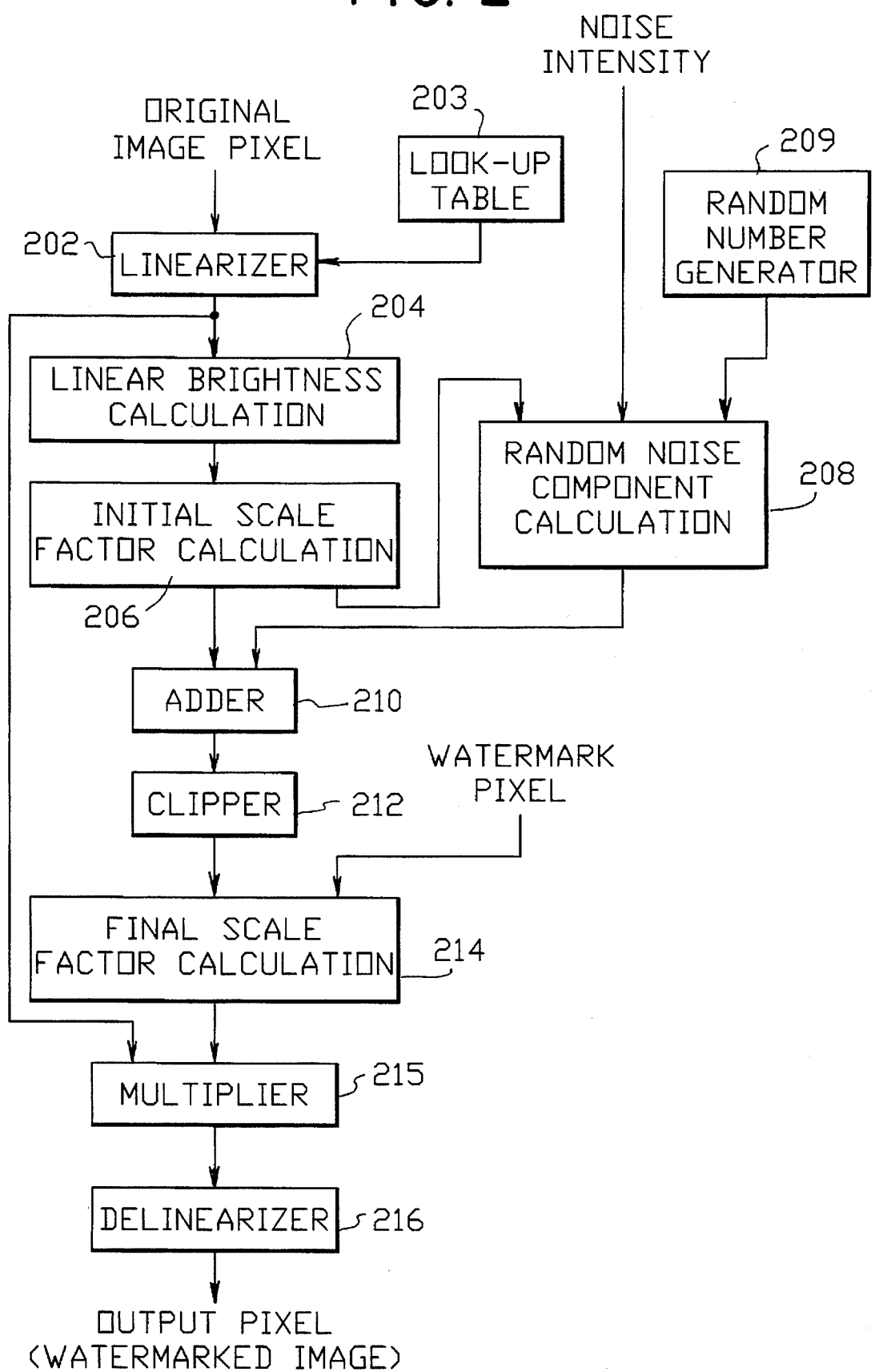
FIG. 2 is a functional level block diagram of an embodiment of the present invention.

A functional block diagram of the watermarking process is shown in FIG. 2. The processing of FIG. 2 is performed for each original image pixel corresponding to a non-transparent watermark image pixel (i.e., a non-transparent pixel within the watermark which is to be placed at the same X,Y coordinates as a given original image pixel). Original image pixels corresponding to transparent watermark image pixels are sent to the image buffer without the processing of FIG. 2.

In block 202 the "original image" pixels are converted to a linear brightness scale for images where this is necessary. The reasons why such conversion would be necessary will be explained in more detail later. The conversion is preferably accomplished by means of a look-up table 203. For a monochrome "original image" the output of this step is the linear brightness Y of the original pixel being processed. For a color image, the output of block 202 is the set of linearized R,G,B values of the pixel.

In block 204 the perceptually uniform brightness L* is calculated as shown in EQUATION 2. For a color image the value of Y is is the brightness of the pixel.

Figure 4:
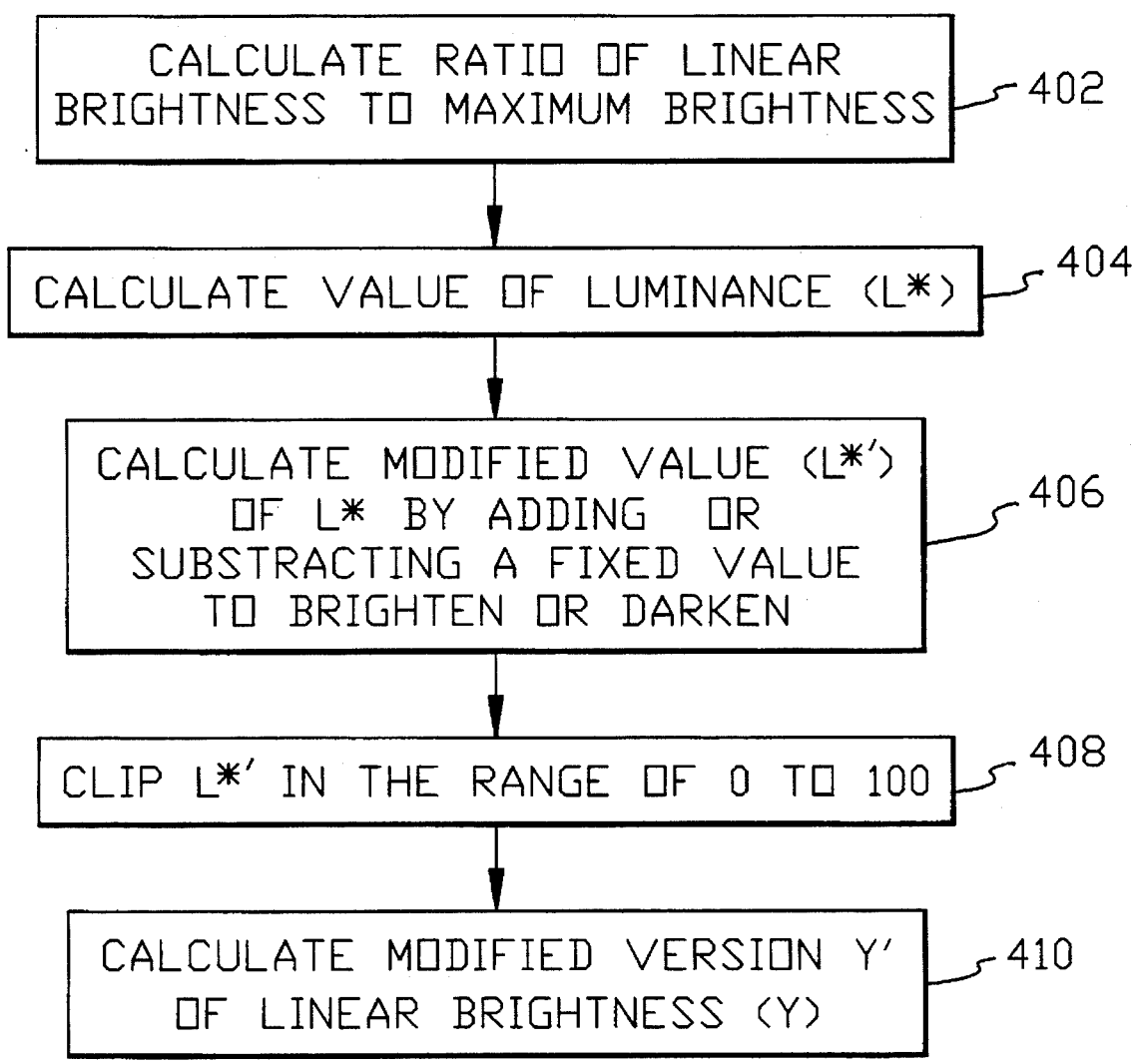
FIG. 4 is a flow chart of calculation of a scaling factor used in the method of FIG. 2; and, FIG. 5 is a flowchart of a method for watermarking color images in accordance with an embodiment of the present invention.

In block 206 a scale factor Y'/Y is calculated as a function of a user (or application program) selected watermark intensity value. This user selected value determines the prominence of the watermark. The details of the scale factor calculation are shown in FIG. 4.

In block 208 a random noise component RN is determined. The random noise component is calculated as a function of the linear brightness Y of the original image pixel, a noise intensity value (NI) (which is selected by a user as an input to the watermarking program), and a random number (which is generated by the computer in block 209). The random number (RND) is such that $-1 \leq RND \leq 1$. The noise intensity value is a number such that $0 \leq NI \leq 1$.

The noise component N is calculated as: $N=NI* |1-(Y'/Y)|$. The noise component determines the graininess of the watermark. A small NI fraction will make the noise adjustment small, producing a very smooth watermark; a larger NI fraction will make the noise adjustments more significant, producing a watermark which is grainier but more difficult to remove. The noise component N is multiplied by the random number RND to produce the random noise component RN.

In block 210, the random noise component RN (determined by block 208) is added to the scale factor Y'/Y. In block 212 the result is clipped to [0,infinity) to produce a pixel scaling factor S.

The calculation of Y'/Y in block 206 and the noise component N in block 208 can be performed for a subset of all possible linear brightness values and the results tabulated, so that for each pixel the only operations required are a pair of table lookups.

In block 214 the final scale factor S' used to scale the pixel is calculated: if the pixel is to be darkened, S'=1+((S−1)*(128−W)/128); if the pixel is to be brightened, S'=1+((S−1)*(W−128)/128). The 128 comes from the range of values which the watermark pixel effectively represents, which in the preferred embodiment is [−128,128]. In the above equations, W is the watermark pixel value, which as described above, can range from 0 to 255.

In block 215, the linear pixel value(s) are multiplied by S'.

Then, in block 216, the result is converted back to the nonlinear pixel value range, if desired.

Figure 3:
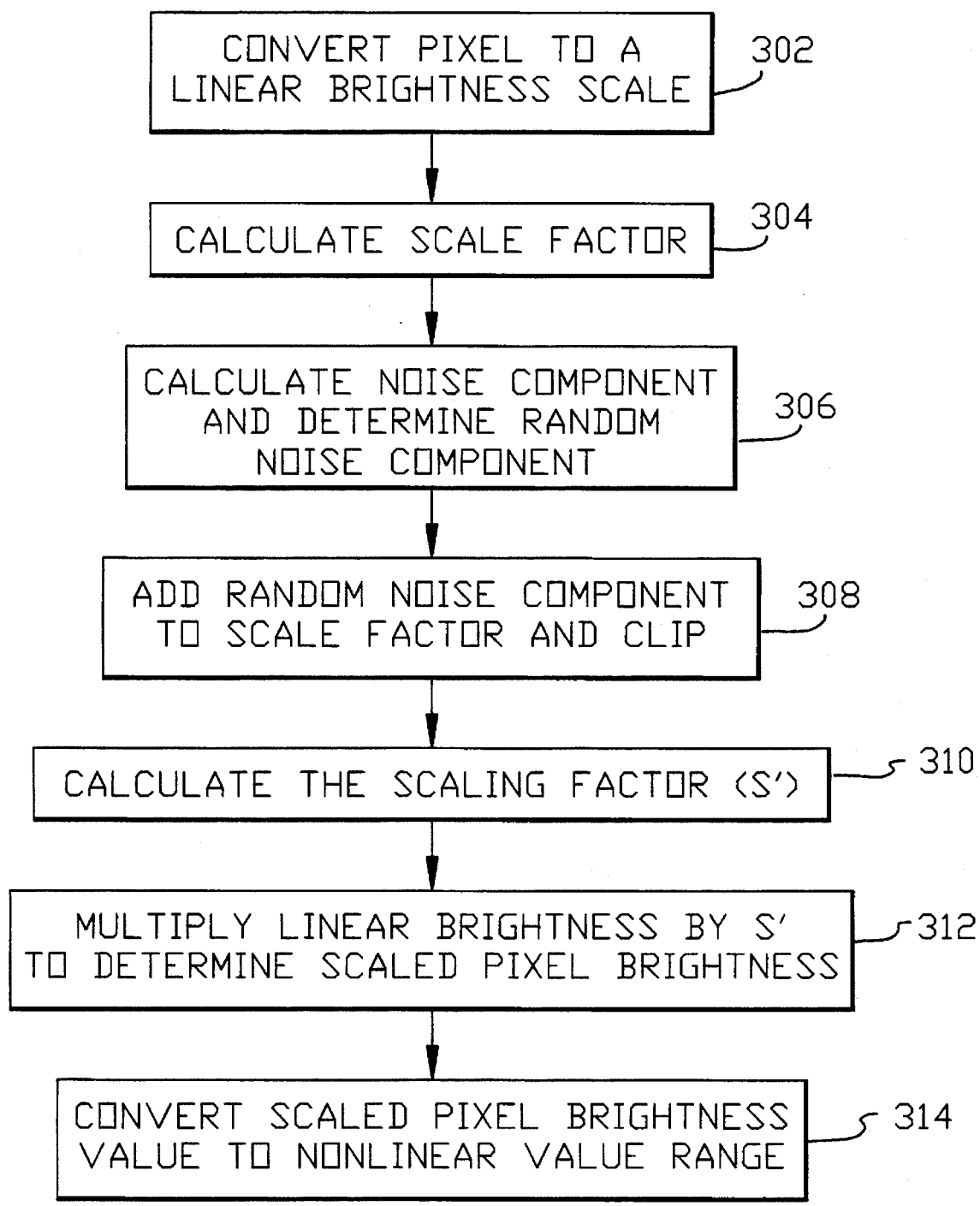
FIG. 3 is a flow chart of a method of watermarking monochrome images in accordance with an embodiment of the present invention.

A flow diagram of the above-described process is shown in steps 302–314 of FIG. 3. In FIG. 3, step 302 corresponds to blocks 202–204 of FIG. 2; step 304 corresponds to block 206; step 306 corresponds to blocks 208 and 209; step 308 corresponds to blocks 210–212; step 310 corresponds to block 214; step 312 corresponds to block 215; and step 314 corresponds to block 216.

The reason for converting to a linear image scale is that images are often stored in a form which uses nonlinear sample values. That is, a given change in the sample value(s) results in different changes in the pixel intensity depending on the original value of the pixel. As an example, monochrome and r/g/b images are typically stored with a gamma correction already applied to compensate for nonlinearities in the display. Thus, before watermarking, block 202 removes this nonlinearity so that the watermarking operation can be consistently applied to result in similar perceived intensity changes in bright and dark areas of the image. After watermarking, the nonlinearity is re-applied in block 216 so that the watermarked image is stored in the same form as the original image.

In some applications the image to be watermarked may be available in a linear brightness form (for example, watermarking may be one of a sequence of operations which are performed in the linear brightness space); in that case it is unnecessary to go through the linearization and delinearization steps 202, 216.

From the foregoing, it should be understood that the watermark does not change the chromaticities of the original image pixels. Instead, the watermark is placed by altering the brightness of the positionally corresponding original image pixels by a user selected value. Optimally, the values of Y for every pixel corresponding to watermark pixels of a given value would be scaled such that perceived changes in their intensity are the same. In practice, this is not quite possible. For example, if a pixel is to be darkened and its original color is black, it cannot be made darker and its value must remain unchanged. However, it is possible over most of the range of pixel values.

The details of the calculation of the initial scale factor in block 206 are shown in FIG. 4. By calculating L* for a given pixel, modifying the calculated value by a constant amount, and reversing the calculation, we obtain Y', a modified version of Y having the same color but with a different brightness. The scaling factor for a given pixel can then be calculated as Y'/Y.

First, in step 402, the ratio of the linear brightness Y to the maximum brightness $Y_n$ is taken. From this ratio, the value of L* is calculated in step 404, using Equation 2. L* expresses the brightness on a scale of 0 to 100. In step 406 a modified value of L*, referred to as L*', is obtained by adding (to brighten) or subtracting (to darken) a fixed amount value from the original. The amount added or subtracted can be input by a user or an application program and determines the prominence of the watermark. The L*' value is clipped to the range 0 to 100 in step 408, and in step 410 the result is fed through the reverse calculation of L* (solving for Y in Equation 2) to obtain a modified version, Y', of the linear brightness of the pixel. The ratio Y'/Y is used as the basic scaling factor.

Figure 5:
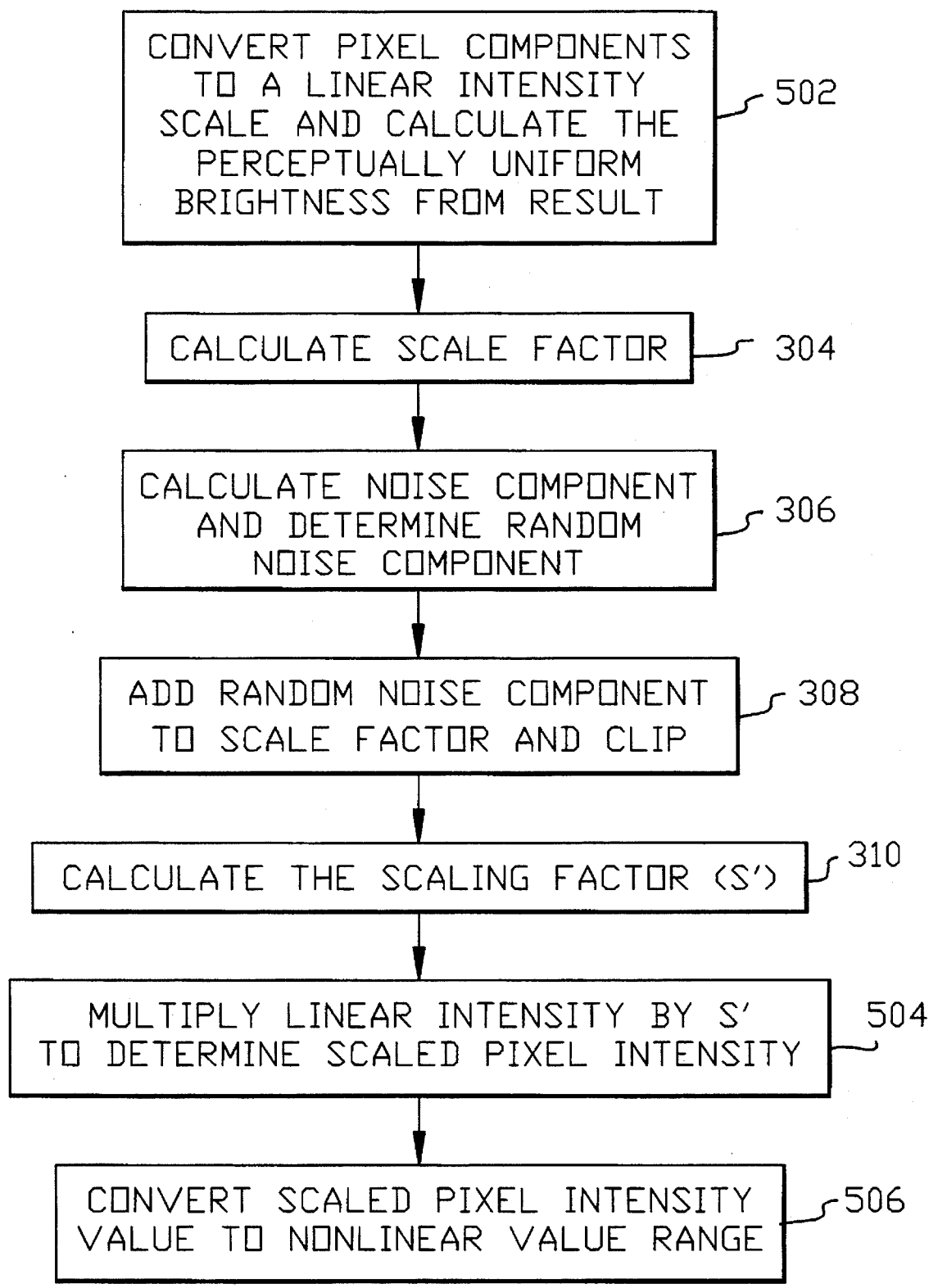

For color images, the watermarking procedure is essentially the same, except that the linear brightness Y of each pixel to be altered typically must be extracted from some combination of the component samples. In an r/g/b image Y is a linear combination of the linearized red, green, and blue components; in a y/cb/cr image Y is the y component with appropriate linearization applied. The procedure for color images is shown in FIG. 5.

In step 502, each pixel component is converted to a linear brightness scale, if necessary. The perceptually uniform brightness of the pixel is calculated from the result using Equation 2.

Next, steps 304 through 310 are performed in the same manner as for a monochrome image to determine the scaling factor S'.

Next, in step 504 the linear intensity of each pixel component is multiplied by S'.

Then, in step 506 the results are converted back to the nonlinear pixel component value ranges, if desired.

Many other variations and enhancements of the basic method are possible. For example, the noise component may be based on an element of a reproducible (ciphered) random sequence, or a noise sequence created by a ciphered key, rather than on a random number; in this case a system for removing the watermark if the watermark image and cipher key are provided could be designed. In a second variation, the decision whether to brighten or darken a pixel could be based on whether its luminance is above or below some arbitrary threshold: brighter pixels could be darkened and darker pixels could be brightened. This would make it more difficult to tell, for pixels near the threshold, which side of the threshold they started on, making the watermark more difficult to remove, and it would make it possible to ensure that the watermark will be visible on backgrounds of any intensity. This method could be further modified by picking the threshold adaptively, e.g., by taking the median of a small region around the pixel to be watermarked and ensuring that the threshold is not close to that value. As another variation, the watermark can be made more difficult to remove by varying the size, position and/or brightness of the watermark and/or intensity of the random noise, from one original image to the next.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

What is claimed is:

1. A method of placing a visible watermark on a digital image, comprising the steps of:

providing a digital original image;

providing a digital watermark image; and, producing a watermarked image by superimposing the watermark image on the original image without changing the chromaticities of pixels of the original image as watermarked.

2. The method of claim 1 wherein the producing comprises the steps of:

for each pixel in the watermark image that is not "transparent", modifying the corresponding pixel of the original image by changing the brightness but not the color.

3. A method of applying a digital watermark to an original image comprising the step of applying the watermark to the original image as a multiplicative correction on pixel sample values of the original image in a linear color space such that the chromaticities of the pixels are not changed.

4. A system for placing a visible watermark on a digital image, comprising:

a storage device having a digital original image and a digital watermark stored therein; and, means for producing a watermarked image by superimposing the watermark on the original image without changing the chromaticities of the original image as watermarked.

5. The system of claim 4 wherein the means for producing comprises:

means for modifying each pixel of the original image corresponding to a non-transparent watermark pixel, by changing the brightness but not the color.

6. A system for applying a digital watermark to an original digital image, comprising:

means for identifying a subset of pixels of the original image that will be modified as a result of applying the watermark;

means for determining a scaling value based on the values of the color components for each of the pixels in the subset, means of multiplying each of the color components of each of the pixels in the subset by its scaling value, and means for storing a resulting watermarked image.

7. A system for applying a digital watermark to an original digital image, comprising:

means for identifying a subset of pixels of the original image to be modified as a result of applying the watermark;

means for linearizing the color components of each pixel in the subset, means for determining a scaling value based on the linearized values of the color components for each pixel in the subset, means of multiplying each component of each pixel in the subset by its scaling value, and means for delinearizing the modified components of each pixel in the subset, and means for storing a resulting watermarked image.

8. The system of claim 7 wherein said means for determining a scaling value S is responsive to a random noise field.

9. The system of claim 7, wherein said means for determining a scaling value S is responsive to an element of a reproducible random sequence, or a noise sequence created by a ciphered key.

10. The system of claim 7 wherein said means for determining a scaling value S is responsive to the value of a corresponding watermark pixel.

11. A method for applying a digital watermark to an original digital image, comprising the steps of:

identifying a subset of pixels of the original image to be modified;

for each pixel in said subset of pixels,
      determining a scaling value based on the values of the color components of said pixel; and,
      multiplying each component of said pixel by said scaling value S, and, storing a resulting watermarked image.

12. The method of claim 11 comprising the further steps of: prior to the determining, linearizing the color components of said pixel; and, subsequent to the multiplying, delinearizing modified components of said pixel.

* * * * *